United States Patent [19]

Yoshizawa

[11] Patent Number: 4,475,071

[45] Date of Patent: Oct. 2, 1984

[54] SPEED CONTROL APPARATUS FOR D.C. MOTOR

[75] Inventor: Fukashi Yoshizawa, Tatsuno, Japan

[73] Assignee: Olympus Optical Company, Ltd., Japan

[21] Appl. No.: 498,844

[22] Filed: May 27, 1984

[51] Int. Cl.³ .............................................. G05B 5/00
[52] U.S. Cl. ........................................ 318/334; 318/331; 318/345 B
[58] Field of Search ............... 318/331, 345 F, 345 B, 318/334, 471, 472, 473

[56] References Cited

U.S. PATENT DOCUMENTS

| | | |
|---|---|---|
| 2,814,012 | 11/1957 | Swanson ........................... 318/331 |
| 3,560,828 | 2/1971 | Kobayashi et al. .............. 318/345 F |
| 3,568,027 | 3/1971 | Bacon et al. .................. 318/345 B X |
| 3,777,244 | 12/1973 | Kosaka ............................... 318/331 |
| 4,085,356 | 4/1978 | Meinema ............................. 318/331 |
| 4,163,182 | 7/1979 | Tanikoshi ........................... 318/331 |

Primary Examiner—Ulysses Weldon
Attorney, Agent, or Firm—Ostrolenk, Faber, Gerb & Soffen

[57] ABSTRACT

A speed control apparatus for d.c. motor includes a bridge circuit formed by the motor and a plurality of resistors. A branch of the bridge circuit which is located opposite to a branch defined by the motor comprises a resistor circuit including a thermistor, thereby achieving a speed control having a reduced temperature dependency.

8 Claims, 5 Drawing Figures

SPEED CONTROL APPARATUS FOR D.C. MOTOR

BACKGROUND OF THE INVENTION

The invention relates to a speed control apparatus for d.c. motor, and more particularly, to such apparatus which exhibits a reduced temperature dependency.

When controlling the speed of a d.c. motor, the speed of rotation of the motor may be detected by a technique as illustrated in FIG. 1. Specifically, a d.c. motor 1 to be controlled and three resistors 2, 3 and 4 are connected in a bridge configuration. Representing the equivalent internal resistance of the motor 1 by $R_a$ and the resistance of the resistors 2, 3 and 4 by $R_1$, $R_2$ and $R_3$, respectively, the bridge, which is fed with a voltage $V_0$ across its pair of terminals A and B, produces a voltage $V_n$ across a pair of detecting terminals C and D, as follows:

$$Vn = \frac{R_3}{R_3 + R_2} \times V_0 - \frac{R_1}{R_1 + R_a} \times (V_0 - E_M) \quad (1)$$

$$= \frac{R_3 R_a - R_1 R_2}{(R_1 + R_a)(R_2 + R_3)} \times V_0 + \frac{R_1}{R_1 + R_a} \times E_m$$

where $E_M$ represents the back electromotive force of the motor. When the resistors $R_1$, $R_2$ and $R_3$ are chosen to satisfy the bridge balance condition:

$$R_1 R_2 = R_3 R_a \quad (2)$$

the equation (1) can be rewritten as follows:

$$Vn = \frac{R_1}{R_1 + R_a} E_m = \frac{R_1}{R_1 + R_a} \cdot Kv \cdot N \quad (3)$$

where Kv represents a constant relating to the back electromotive force of the motor and N the rotational speed of the motor. Thus it is seen that the voltage $V_n$ developed across the pair of detecting terminals is a function of the rotational speed N alone, allowing the rotational speed to be determined by a measurement of the voltage $V_n$. Conversely, by maintaining the voltage $V_n$ constant, a speed control can be achieved which maintains the speed N constant.

However, when ordinary resistors such as carbon film resistors are used for the resistors 2, 3 and 4, the equation (2) may not be satisfied with a temperature change since the equivalent internal resistance $R_a$ of the motor 1 has a greater positive temperature coefficient as compared with those of other three resistors. Consequently, the first term in the equation (1) is no longer negligible, and the factor $R_1/(R_1+R_a)$ in the second term varies with temperature. Thus, the voltage $V_n$ is expressed as follows:

$$Vn = f(T, \text{Torque}) + g(T) \cdot E_M \quad (4)$$

and thus is a function of not only the rotational speed N, but is also a function of the temperature (T) and load or torque.

This means that when three resistors having an equal temperature coefficient and the motor are used to form a bridge circuit and a speed control scheme is employed which maintains the voltage $V_n$ constant, the rotational speed will vary with a change in the temperature and the load, in a manner as illustrated graphically in FIG. 2, thus precluding a proper speed control.

To achieve a reduced temperature dependency, an approach has been proposed which employs a special resistor for the resistor 3 having the same temperature coefficient as the equivalent resistance $R_a$ of the motor. However, the manufacture of such a special resistor having a desired temperature coefficient requires that parameters of a complex manufacturing process be determined through experience and by a trial-and-error technique. If such a resistor is produced, the temperature coefficient may change during its practical use due to heat conduction from a substrate on which the resistor is mounted or terminals connected therewith or a convection within an apparatus. To prevent such external influences, a special consideration is necessary to choose a particular packaging material, its configuration or lead wire material having a reduced thermal conduction or a mounting thereof. It will be seen that the use of such a complicated manufacturing process and the difficulty of design in the choice and the implementation of a package result in an increased cost of such resistor.

SUMMARY OF THE INVENTION

The invention has for its object the elimination of described disadvantages of conventional speed control apparatus for d.c. motor, and provides a speed control apparatus for d.c. motor which exhibits a reduced temperature dependency without the use of any special resistor, by forming a branch of a bridge which is not directly connected to the motor with a resistor circuit including a thermistor.

In accordance with the invention, a branch of a bridge, formed by a d.c. motor and resistors, comprises a pair of series resistors, one of which is shunted by a thermistor. With this simple arrangement, the temperature dependency of the speed control apparatus can be improved without using any special material.

DESCRIPTION OF PREFERRED EMBODIMENT

Figure 3:
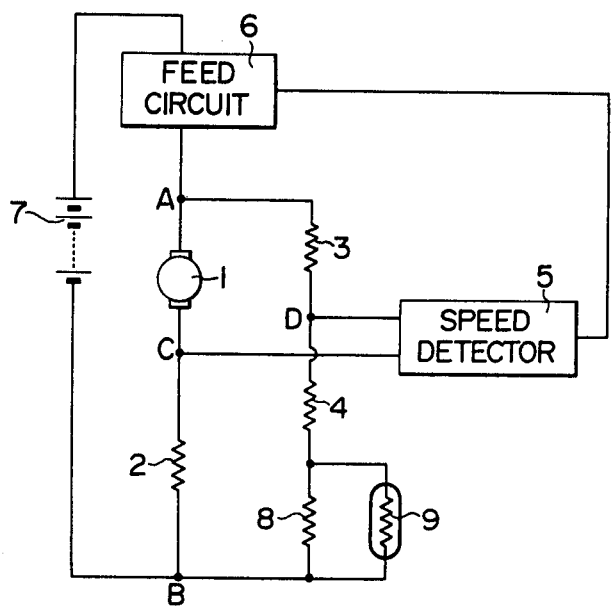
FIG. 3 is a circuit diagram of a speed control apparatus according to one embodiment of the invention.

Referring to FIG. 3, there is shown a speed control apparatus for d.c. motor according to one embodiment of the invention. A bridge circuit is formed by a d.c. motor to be controlled, and resistors 2 and 3, each of which defines a branch of the bridge. The remaining (a fourth) branch is formed by a series combination of resistors 4 and 8, with the resistor 8 being shunted by a thermistor 9 having a negative temperature coefficient. It will be seen that the branch including the thermistor is located opposite to the branch defined by the motor 1. A speed detector 5 is connected across a pair of detecting terminals, which are formed by a junction C between the motor 1 and the resistor 2 and another junction D between the resistors 3 and 4, for detecting a change in the voltage developed across the junctions C and D and for amplifying it. An output from the speed detector 5 is applied to a feed circuit, which is connected to feed power from a d.c. source 7 to the bridge circuit across its pair of feed terminals A and B.

Figure 1:
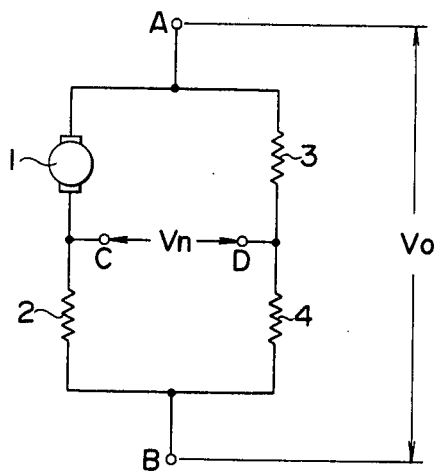
FIG. 1 is a circuit diagram of a conventional speed control apparatus for d.c. motor.

Representing the impedance of the branch comprising the resistors 4 and 8 and the thermistor 8 by $Z_3$, the equivalent internal resistance of the motor 1 by $R_a$, and the resistance of the resistors 2 and 3 by $R_1$ and $R_2$, respectively, the voltage Vn across the junctions C and D can be derived, by analogy to the circuit arrangement of FIG. 1, as follows:

$$Vn = \frac{Z_3 R_a - R_1 R_2}{(R_1 + R_a)(R_2 + Z_3)} \times V_0 + \frac{R_1}{R_1 + R_a} \times E_m \quad (5)$$

Representing the equivalent internal resistance of the motor 1, the resistance of the resistors 2 and 3 and the impedance of the branch including the thermistor 9 which prevail at temperature $T_1$ by $R_{a1}$, $R_{11}$, $R_{21}$ and $Z_{31}$, respectively, and corresponding values at temperature $T_2$ by $R_{a2}$, $R_{12}$, $R_{22}$ and $Z_{32}$, respectively, we have:

$$R_{12} = (T_2 - T_1)\cdot\gamma\cdot R_{11} + R_{11} = (1 + \Delta T \cdot \gamma)\cdot R_{11} \quad (6)$$

$$R_{22} = (T_2 - T_1)\cdot\gamma\cdot R_{21} + R_{21} = (1 + \Delta T \cdot \gamma)\cdot R_{21} \quad (7)$$

$$R_{a2} = (T_2 - T_1)\cdot\beta\cdot R_{a1} + R_{a1} = (1 + \Delta T \cdot \beta)\cdot R_{a1} \quad (8)$$

$$Z_{32}(T_2 - T_1)\cdot\alpha\cdot Z_{31} + Z_{31} = (1 + \Delta T \cdot \alpha)\cdot Z_{31} \quad (9)$$

where $\Delta T = T_2 - T_1$, and $\alpha$, $\beta$ and $\gamma$ represent the temperature coefficient of the impedance $Z_3$, the equivalent internal resistance $R_a$ and the temperature coefficient of the resistors $R_1$ and $R_2$, respectively.

The bridge balance condition can be derived from the equation (5) as follows:

$$R_{a1}\cdot Z_{31} = R_{11}\cdot R_{21} \quad \text{(at temperature } T_1) \quad (10)$$

$$R_{a2}\cdot Z_{32} = R_{12}\cdot R_{22} \quad \text{(at temperature } T_2) \quad (11)$$

The temperature coefficient $\gamma$ of the resistors 2 and 3 is generally negligibly small as compared with the temperature coefficient $\beta$ of the equivalent internal resistance of the motor or $\gamma \ll 1$, and therefore can be neglected. It then follows that $R_{11} = R_{12}$ and $R_{21} = R_{22}$. From the equations (10) and (11), we have:

$$R_{a1}\cdot Z_{31} = R_{a2}\cdot Z_{32} \quad (12)$$

If this condition is satisfied, it follows that the first term of the equation (5) is maintained zero independently from the temperature, and the temperature dependency of the rotational speed can be reduced and the load dependency of the rotational speed can be removed if the rotational speed is controlled on the basis of the voltage Vn.

Substituting the equations (8) and (9) into the equation (12), $$R_{a1}\cdot Z_{31} = \{(1 + \Delta T \cdot \beta)\cdot R_{a1}\}\cdot\{(1 + \Delta T \cdot \alpha)\cdot Z_{31}\}$$

Solving this equation for $\alpha$, $$\alpha = -\beta/(1 + \Delta T \cdot \beta)$$

Since $$\Delta T \cdot \beta \ll 1,$$

we have $$\alpha \approx -\beta \quad (13)$$

Thus, by utilizing the resistors 4 and 8 and the thermistor 9 to form the branch which is located opposite to the motor and choosing its components so that a temperature coefficient which is equal and opposite to that of the equivalent internal resistance $R_a$ of the motor (thus a negative temperature coefficient having an absolute value which is equal to that of the resistance $R_a$) is obtained, the temperature dependency of the rotational speed can be reduced and the load dependency of the rotational speed removed if the rotational speed is controlled on the basis of the voltage Vn detected. The first term of the equation (5) is neglected, but the second term has a temperature dependency. When the temperature coefficient of the resistors 2 and 3 is made equal to zero and representing their resistance by $R_1$ and $R_2$, respectively, the equation (5) can be rewritten as follows:

$$Vn = \frac{R_1}{R_1 + R_{a1}} \times E_m \text{ (at temperature } T_1) \quad (14)$$

$$Vn = \frac{R_1}{R_1 + (1 + \Delta T \cdot \beta)R_{a1}} \times E_m \text{ (at temperature } T_2) \quad (15)$$

Figure 4:
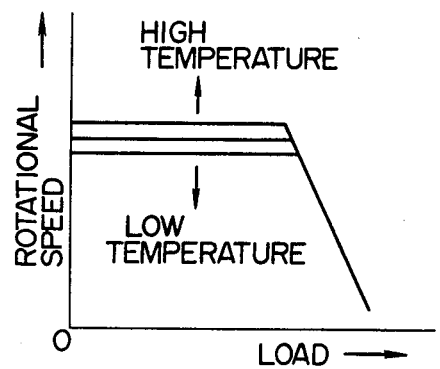
FIGS. 4 and 5 graphically illustrate the temperature and the load response of the embodiment shown in FIG. 3.

By maintaining Vn constant, the rotational speed increases with a temperature rise, as graphically illustrated in FIG. 4.

Figure 2:
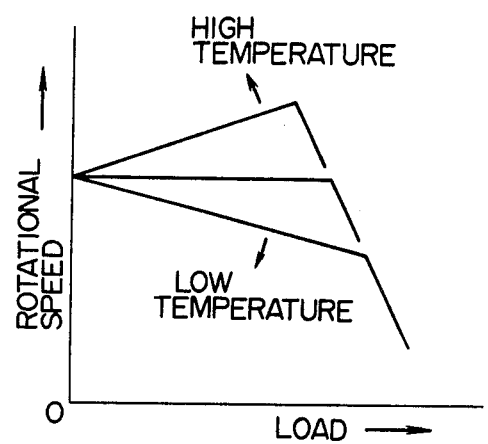
FIG. 2 graphically illustrates the relationship between the rotational speed and the load and the temperature in the arrangement of FIG. 1.
Figure 5:
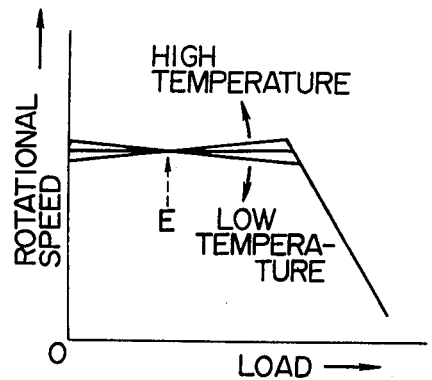

However, a response which is intermediate the responses shown in FIGS. 2 and 4 can be achieved as indicated graphically in FIG. 5, by choosing a negative temperature coefficient for the impedance of the branch including the thermistor 9 which is not perfectly equal to, but is slightly offset from the temperature coefficient of the equivalent internal resistance $R_a$ of the motor so that a degree of load dependency remains with the voltage Vn.

In actual design, the temperature coefficient of the impedance $Z_3$ may be chosen so that a point E where the temperature dependency is at its minimum (see FIG. 5) is located at the rated value of the load connected to the motor, thereby achieving a favorable improvement of a change in the rotational speed with temperature change. Instead of utilizing the pair of resistors 4, 8 in combination with the thermistor 9, the thermistor may be combined with a single resistor or a plurality of resistors.

What is claimed is:

1. A speed control apparatus for a D.C. motor, comprising:
a bridge circuit having four branches and a respective node located between each pair of adjacent branches, three of the branches of said bridge circuit being formed by a respective resistive circuit, the remaining branch including a D.C. motor whose speed is to be controlled, the nominal value of the resistances of said four branches being such that the voltage across a first pair of opposite nodes of said bridge circuit will be indicative of the speed of said D.C. motor, the resistive circuit forming the branch of said bridge circuit which is opposite the branch including said D.C. motor having a temperature coefficient which is substantially equal in absolute magnitude and opposite in sign to the temperature coefficient of said branch including said D.C. motor whereby the voltage across said first pair of opposite nodes will remain indicative of the speed of said motor substantially independent of fluctuations in temperature;

a speed detection circuit connected across said first pair of opposite nodes for generating an output signal indicative of the voltage across said first pair of opposite nodes, and, therefore, indicative of the speed of said D.C. motor; and a voltage control circuit for controlling the voltage across the remaining pair of opposite nodes of said bridge circuit, and thereby controlling the voltage applied to said D.C. motor, as a function of said speed signal.

2. A speed control apparatus according to claim 1, wherein the resistive circuit forming the branch of said bridge circuit which is located opposite the branch including said D.C. motor comprising a thermistor and at least one resistor.

3. A speed control apparatus according to claim 2, wherein said resistive circuit forming the branch of said bridge circuit which is opposite the branch including said D.C. motor comprises a pair of series connected resistors and a thermistor which is connected in shunt with one of said resistors.

4. A speed control apparatus, comprising:

a d.c. motor which forms a bridge circuit together with a plurality of resistors, the nominal resistances of the resistors and motor being so related that an output voltage of the bridge circuit is indicative of the speed of the motor, a branch of the bridge circuit which is located opposite to a branch defined by the motor being formed by a resistor circuit having a temperature coefficient which is substantially equal in absolute magnitude and opposite in sign to the temperature coefficient of the equivalent internal resistance of the motor; and a speed control circuit responsive to said output voltage of the bridge circuit so as to vary a voltage applied to said motor in a manner which causes said output voltage of the bridge circuit, and, therefore, the speed of the motor to remain constant.

5. A speed control apparatus according to claim 4 in which the resistor circuit comprises a thermistor and at least one resistor.

6. A speed control apparatus according to claim 4 in which said speed control circuit includes a speed detector connected to a pair of output terminals of the bridge circuit to provide a signal fed to a feed circuit which controls the power supply to the bridge circuit.

7. A speed control apparatus according to claim 5 in which the resistor circuit comprises a pair of series resistors, and a thermistor which is connected in shunt with one of the resistors.

8. A speed control apparatus according to claim 4 in which the temperature coefficient of the resistor circuit is chosen in accordance with a rated value of a load connected to the motor.

* * * * *